United States Patent
Keating et al.

(10) Patent No.: US 12,160,302 B2
(45) Date of Patent: Dec. 3, 2024

(54) RECEIVER BEAM SELECTION DURING UPLINK POSITIONING

(71) Applicant: Nokia Technologies Oy, Espoo (FI)

(72) Inventors: Ryan Keating, Chicago, IL (US); Daejung Yoon, Massy (FR); Sigen Ye, Whitehouse Station, NJ (US); Tao Tao, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 355 days.

(21) Appl. No.: 17/601,725

(22) PCT Filed: Apr. 30, 2019

(86) PCT No.: PCT/CN2019/085134
§ 371 (c)(1),
(2) Date: Oct. 6, 2021

(87) PCT Pub. No.: WO2020/220243
PCT Pub. Date: Nov. 5, 2020

(65) Prior Publication Data
US 2022/0060243 A1    Feb. 24, 2022

(51) Int. Cl.
*H04B 7/08* (2006.01)
*H04B 7/0408* (2017.01)
*H04W 4/08* (2009.01)

(52) U.S. Cl.
CPC .......... *H04B 7/088* (2013.01); *H04B 7/0408* (2013.01); *H04W 4/08* (2013.01)

(58) Field of Classification Search
CPC .... H04B 7/088; H04B 7/0408; H04B 7/0452; H04W 4/08; H04W 8/186; G01S 5/0205; G01S 5/0221; G01S 5/0236
See application file for complete search history.

(56) References Cited

U.S. PATENT DOCUMENTS 9,853,707 B2    12/2017    Yu et al.
2010/0203891 A1    8/2010    Nagaraja et al.
(Continued)

FOREIGN PATENT DOCUMENTS

CN    101110627 A    1/2008
CN    101689880 A    3/2010
(Continued)

OTHER PUBLICATIONS

Extended European Search Report received for corresponding European Patent Application No. 19926874.9, dated Nov. 23, 2022, 14 pages.
(Continued)

*Primary Examiner* — Sam K Ahn
*Assistant Examiner* — Amneet Singh
(74) *Attorney, Agent, or Firm* — Robert P. Michal, Esq.; Carter, DeLuca & Farrell LLP

(57) ABSTRACT

Method, apparatuses, and computer program product for providing an efficient receiver beam selection scheme during positioning which utilizes the uplink (UL). One method may include creating a group of user equipment with one or more user equipment according to user equipment characteristics. The method may also include assigning a group identification for the group of user equipments. The method may further include assigning an anchor user equipment for the group of user equipments.

7 Claims, 7 Drawing Sheets

(56) References Cited

U.S. PATENT DOCUMENTS

| | | | |
|---|---|---|---|
| 2012/0058733 | A1 | 3/2012 | Jovicic et al. |
| 2014/0003319 | A1 | 1/2014 | Etemad |
| 2015/0201394 | A1 | 7/2015 | Qu et al. |
| 2016/0095080 | A1 | 3/2016 | Khoryaev et al. |
| 2016/0191131 | A1 | 6/2016 | Balraj et al. |
| 2018/0049024 | A1 | 2/2018 | Schliwa-Bertling et al. |
| 2018/0152852 | A1* | 5/2018 | Chang .................. H04B 7/0695 |
| 2018/0192390 | A1* | 7/2018 | Li .......................... H04W 28/02 |
| 2018/0199212 | A1 | 7/2018 | Lin et al. |
| 2019/0097705 | A1 | 3/2019 | Ho et al. |
| 2019/0200320 | A1 | 6/2019 | Selvaganapathy et al. |
| 2019/0239092 | A1* | 8/2019 | Zhou ...................... H04W 16/28 |
| 2021/0329596 | A1* | 10/2021 | Freda .................. H04W 72/542 |

FOREIGN PATENT DOCUMENTS

| | | |
|---|---|---|
| CN | 104272855 A | 1/2015 |
| CN | 104380140 A | 2/2015 |
| CN | 104937986 A | 9/2015 |
| CN | 105247931 A | 1/2016 |
| CN | 105378715 A | 3/2016 |
| CN | 106662634 A | 5/2017 |
| CN | 106879076 A | 6/2017 |
| CN | 107079530 A | 8/2017 |
| CN | 108605265 A | 9/2018 |
| CN | 108702180 A | 10/2018 |
| CN | 108777589 A | 11/2018 |
| CN | 109478919 A | 3/2019 |
| CN | 109478986 A | 3/2019 |
| CN | 107079530 B | 2/2021 |
| EP | 2663105 A1 | 11/2013 |
| JP | 2017-527806 A | 9/2017 |
| WO | 2006/126079 A2 | 11/2006 |
| WO | 2013/072271 A1 | 5/2013 |
| WO | 2016/048509 A1 | 3/2016 |
| WO | 2018/056730 A1 | 3/2018 |
| WO | 2018/099568 A1 | 6/2018 |
| WO | 2018/100189 A1 | 6/2018 |
| WO | 2018/127148 A1 | 7/2018 |
| WO | 2019/036578 A1 | 2/2019 |
| WO | 2019/040708 A1 | 2/2019 |

OTHER PUBLICATIONS

"Beam management and beam reporting", 3GPP TSG RAN WG1 Meeting #88bis, R1-1704488, Agenda: 8.1.2.2.1, vivo, Apr. 3-7, 2017, 7 pages.

Office action received for corresponding Chinese Patent Application No. 201980095919.4, dated Sep. 2, 2022, 7 pages of office action and no page of translation available.

Lin et al., "A model of group mobility management based on user behavior prediction", Telecommunications Science, vol. 33, No. 8, 2017, pp. 94-99.

Extended European Search Report received for corresponding European Patent Application No. 19926874.9, dated Apr. 25, 2023, 26 pages.

"Discussion on synchronization of D2D discovery", 3GPP TSG RAN WG1 Meeting #74bis, R1-134502, Agenda: 7.2.8.2.1, NTT Docomo Inc, Oct. 7-11, 2013, pp. 1-5.

Office action received for corresponding Chinese Patent Application No. 201980095919.4, dated Mar. 9, 2023, 6 pages of office action and no page of translation available.

"3rd Generation Partnership Project; Technical Specification Group Radio Access Network; Location Measurement Unit (LMU) conformance specification; Network based positioning systems in Evolved Universal Terrestrial Radio Access Network (E-UTRAN) (Release 15)", 3GPP TS 36.112, V15.0.0, Jun. 2018, pp. 1-67.

"Revised SID: Study on NR positioning support", 3GPP TSG RAN Meeting #81, RP-182155, Agenda: 9.3.18, Intel Corporation, Sep. 10-13, 2018, 6 pages.

"3rd Generation Partnership Project; Technical Specification Group Radio Access Network; Study on NR positioning support (Release 16)", 3GPP TR 38.855, V16.0.0, Mar. 2019, pp. 1-197.

"Remaining issues on UL-based positioning", 3GPP TSG RAN WG1 Meeting #96, R1-1901575, Huawei, Feb. 25-Mar. 1, 2019, 7 pages.

International Search Report and Written Opinion received for corresponding Patent Cooperation Treaty Application No. PCT/CN2019/085134, dated Jan. 21, 2020, 9 pages.

* cited by examiner

RECEIVER BEAM SELECTION DURING UPLINK POSITIONING

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to apparatuses, systems, and/or methods for providing an efficient receiver beam selection scheme during uplink positioning.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRA radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

In accordance with some example embodiments, a method may include receiving, at a user equipment, receiving an indication identifying a user equipment as an anchor user equipment. The method may also include join a group of user equipment with one or more user equipment according to user equipment characteristics. The method may further include performing a repeated reference signal transmission procedure with a neighboring network element for positioning.

In accordance with some example embodiments, a method may include creating a group of user equipment with one or more user equipment according to user equipment characteristics. The method may also include assigning a group identification for the group of user equipments. The method may further include assigning an anchor user equipment for the group of user equipments.

In accordance with some example embodiments, an apparatus may include means for creating a group of user equipment with one or more user equipment according to user equipment characteristics. The apparatus may also include means for assigning a group identification for the group of user equipments. The apparatus may further include means for assigning an anchor user equipment for the group of user equipments.

In accordance with some example embodiments, an apparatus may include at least one processor and at least one memory including computer program code. The at least one memory and the computer program code may be configured to, with the at least one processor, cause the apparatus at least to create a group of user equipment with one or more user equipment according to user equipment characteristics. The apparatus may also be caused to assign a group identification for the group of user equipments. The apparatus may further be caused to assign an anchor user equipment for the group of user equipments.

In accordance with some example embodiments, a non-transitory computer readable medium can be encoded with instructions that may, when executed in hardware, perform a method. The method may create a group of user equipment with one or more user equipment according to user equipment characteristics. The method may also assign a group identification for the group of user equipments. The method may further assign an anchor user equipment for the group of user equipments.

In accordance with some example embodiments, a computer program product may perform a method. The method may create a group of user equipment with one or more user equipment according to user equipment characteristics. The method may also assign a group identification for the group of user equipments. The method may further assign an anchor user equipment for the group of user equipments.

In accordance with some embodiments, an apparatus may include circuitry configured to create a group of user equipment with one or more user equipment according to user equipment characteristics. The circuitry may also be configured to assign a group identification for the group of user equipments. The circuitry may further be configured to assign an anchor user equipment for the group of user equipments.

In accordance with some example embodiments, a method may include receiving, from a network element, an identification of an anchor user equipment at a neighboring network element. The method may also include performing a receiving beam training procedure with the anchor user equipment to obtain a trained receiver beam. The method may further include performing a receiver beam sweeping procedure to receive a reference signal from the anchor user equipment. The method may also include determining, based on the receiver beam sweeping procedure, at least one best receiver beam for the anchor user equipment.

In accordance with some example embodiments, an apparatus may include means for receiving, from a network element, an identification of an anchor user equipment at a neighboring network element. The apparatus may also include means for performing a receiving beam training procedure with the anchor user equipment to obtain a trained receiver beam. The apparatus may further include means for performing a receiver beam sweeping procedure to receive a reference signal from the anchor user equipment. The apparatus may also include means for determining, based on the receiver beam sweeping procedure, at least one best receiver beam for the anchor user equipment.

In accordance with some example embodiments, an apparatus may include at least one processor and at least one memory including computer program code. The at least one memory and the computer program code may be configured to, with the at least one processor, cause the apparatus at least to receive, from a network element, an identification of an anchor user equipment at a neighboring network element.

The apparatus may also be caused to perform a receiving beam training procedure with the anchor user equipment to obtain a trained receiver beam. The apparatus may further be caused to perform a receiver beam sweeping procedure to receive a reference signal from the anchor user equipment. The apparatus may also be caused to determine, based on the receiver beam sweeping procedure, at least one best receiver beam for the anchor user equipment.

In accordance with some example embodiments, a non-transitory computer readable medium can be encoded with instructions that may, when executed in hardware, perform a method. The method may receive, from a network element, an identification of an anchor user equipment at a neighboring network element. The method may also perform a receiving beam training procedure with the anchor user equipment to obtain a trained receiver beam. The method may further perform a receiver beam sweeping procedure to receive a reference signal from the anchor user equipment. In addition, the method may determine, based on the receiver beam sweeping procedure, at least one best receiver beam for the anchor user equipment.

In accordance with some example embodiments, a computer program product may perform a method. The method may receive, from a network element, an identification of an anchor user equipment at a neighboring network element. The method may also perform a receiving beam training procedure with the anchor user equipment to obtain a trained receiver beam. The method may further perform a receiver beam sweeping procedure to receive a reference signal from the anchor user equipment. In addition, the method may determine, based on the receiver beam sweeping procedure, at least one best receiver beam for the anchor user equipment.

In accordance with some embodiments, an apparatus may include circuitry configured to receive, from a network element, an identification of an anchor user equipment at a neighboring network element. The circuitry may also be configured to perform a receiving beam training procedure with the anchor user equipment to obtain a trained receiver beam. The circuitry may further be configured to perform a receiver beam sweeping procedure to receive a reference signal from the anchor user equipment. In addition, the circuitry may be configured to determine, based on the receiver beam sweeping procedure, at least one best receiver beam for the anchor user equipment.

BRIEF DESCRIPTION OF THE DRAWINGS

For proper understanding of the invention, reference should be made to the accompanying drawings, wherein.

DETAILED DESCRIPTION

Figure 1:
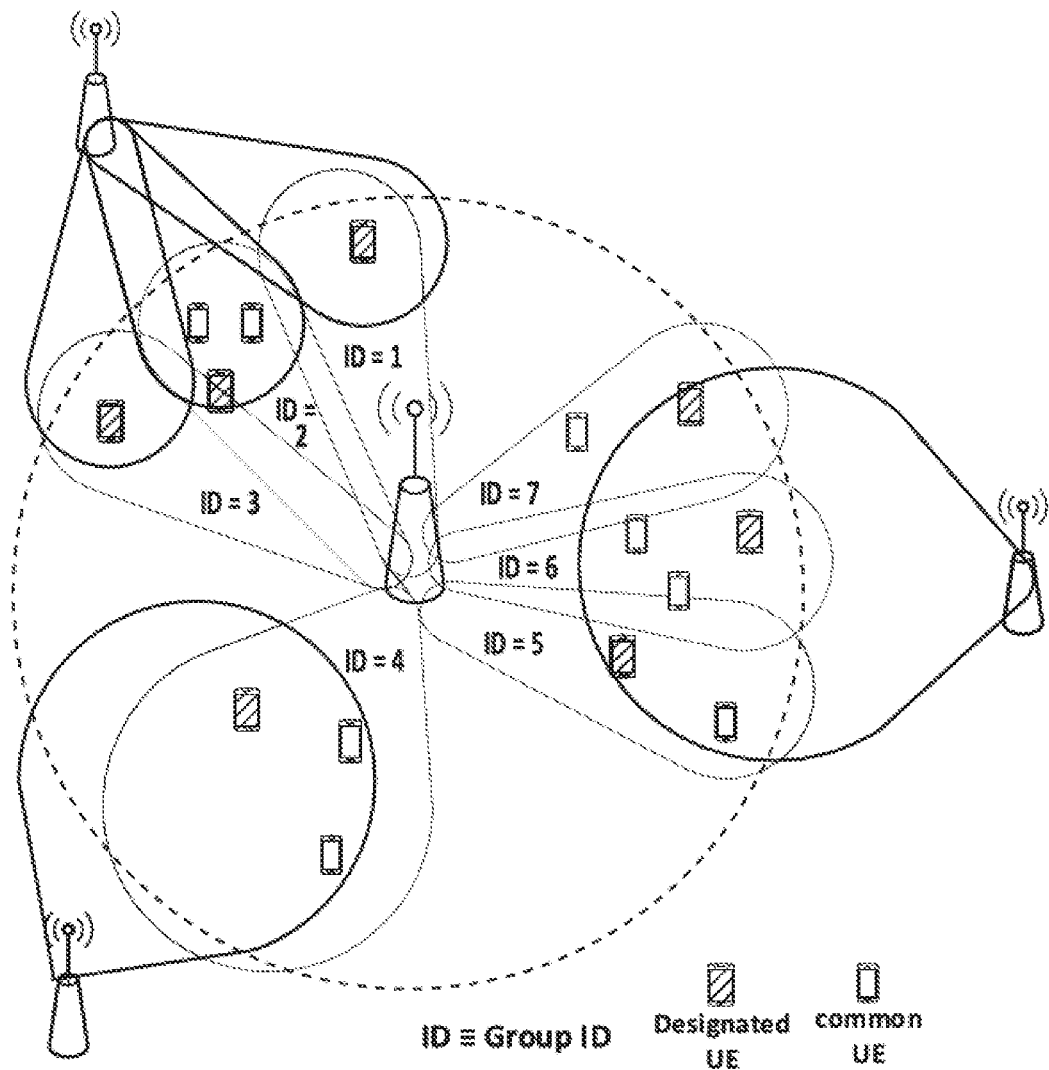
FIG. 1 illustrates assigning a group identification for uplink positioning for each UE based on characteristics of beam, signal strength, or signal distance, according to an example embodiment.

It will be readily understood that the components of certain example embodiments, as generally described and illustrated in the figures herein, may be arranged and designed in a wide variety of different configurations. In addition, the following is a detailed description of some example embodiments of systems, methods, apparatuses, and computer program products for providing an efficient receiver beam selection scheme during uplink (UL) positioning.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Procedures for $3^{rd}$ Generation Partnership Project (3GPP) include positioning support in New Radio (NR). In particular, several positioning solutions have been agreed to be specified in NR Rel-16, which include Downlink Time Difference of Arrival (DL-TDOA), Uplink Time Difference of Arrival (UL-TDOA), Downlink Angle of Departure (DL-AoD), Uplink Angle of Arrival (UL-AoA), and Multi-cell Round Trip time (Multi-RTT). Note that UL-TDOA was previously called UTDOA in prior cellular systems (e.g., LTE). Similarly, DL-TDOA was previously referred to as Observed Time Difference of Arrival (OTDOA) in prior cellular systems.

Three of the above-described techniques, namely UL-TDOA, UL-AoA, and Multi-RTT require the use of an UL reference signal (RS). It has been recommended that UL sounding reference signal (SRS) be a starting point with enhancements as necessary. In particular, it is preferable that the SRS is received at as many reception points as possible to increase the number of measurements that can be made for a given user equipment (UE). As the number of positioning measurements increases, the achievable accuracy can improve. Additional reference signals, other than the SRS, may also be used for UL positioning solutions. For example, in some example embodiments, it is possible to hold for reference signals other than the SRS as well.

For positioning, it has been identified that some aspects of the SRS were left for further discussion including, "Use of UL beam alignment at frequency region (FR) 2 through downlink (DL) reception and beam correspondence." This refers to a UE reporting radio resource management (RRM) measurements/index(es) so that the receiver (RX) beam for uplink could be selected at various 5G base stations (gNBs) based on the reported downlink measurements for positioning measurements.

In LTE, when UTDOA was specified, the timing measurements were made by location measurement units (LMU). In particular, LMU classes in LTE have been previously defined, and an LMU may be deployed in three ways: (1) LMU class 1: LMU integrated into base station; (2) LMU class 2: LMU co-sited with base station and sharing antenna with the base station; and (3) LMU class 3: standalone LMU with own receive antenna. LMUs have yet to be introduced in NR, but may be introduced in Rel-16. The LMU may be introduced in NR by another name, e.g. transmission measurement function (TMF).

As previously noted, it is necessary for UL-TDOA, UL-AoA, and Multi-RTT positioning methods to receive SRS from a single UE at many gNBs. In LTE, the SRS is sent in an omni-directional manner so that the UE is able to be heard by many base stations. This may also be the case for FR1 in NR. However, for FR2, there may be beamforming used both at the UE for transmission and at the gNB for reception of SRS. Due to the limited antenna array size at the UE, the gains from received beamforming are larger for UL transmission and reception. This potentially complicates any positioning solution which uses the SRS. Thus, the SRS may need to be repeated many times by the UE in order for the SRS to be received using the best RX beam at each gNB.

The serving cell knows which RX beam to use as the serving cell knows the synchronization signal bock/channel state information reference signal (SSB/CSI-RS) beam index. However, for the neighboring cells, this is not as straightforward. In particular, it may be quite costly in terms of resources to have the SRS repeated enough times for the correct RX beams to be used at each gNB. This may especially be true when large numbers of UEs within a cell are using location services such as, for example, in the Industrial Internet of Things (IIoT) scenario.

Additionally, FR2 (i.e., mmWave) may have a large role in NR systems. Moreover, FR2 may be desired for positioning solutions due to the wide bandwidths available. Therefore, having efficient positioning solutions for this frequency band is critical to complete positioning solutions. Certain example embodiments described herein address the problems described above with regard to RX beam selection at neighboring gNBs for UL positioning measurements.

The idea of using UL-DL beam alignment in SRS in UL positioning have been discussed. As noted above, the idea is to use the DL beams from the neighboring cells to determine which transmitter (TX) and RX beams to use for the SRS transmission and reception. In large part, this relies on making RRM measurements that have been specified in Rel-15. The UE would need to report the DL beams (in the form of SSB/CSI-RS indexes) that it receives from neighboring cells in order for the RX beams at the neighbor cells to be properly selected.

However, the previously described approach has several drawbacks. For instance, it assumes that perfect reciprocity can be relied on, but results have shown that this is not always possible. In addition, the UE may not measure the SSB/CSI-RS of all the cells that want to try to receive it for UL positioning. Further, the requirements for measuring SSB may be a few dB higher than is necessary for positioning measurements to be made on SRS.

Another drawback is that the UE may not be able to currently fully report SSB/CSI-RS indexes. The current reporting structure in Rel-15 is limited in the number of indexes. Further, the UE may not want to send a full report of the best SSB to every cell before every UL positioning occasion. This is at least because the number of cells could be as high as about 12 to 15 cells. Additionally, using the SSB/CSI-RS index from neighbor cells may require a type of L3-reference signal received power (RSRP) measurement, which must be triggered by a specific event. Thus, if one of these events does not happen (e.g., static UE) or has taken place too long ago, then these measurements may not be useful or available. As such, certain example embodiments provide a solution by using UE groups to determine and signal the best RX beams at the neighbor gNB(s) for SRS reception.

According to an example embodiment, a scheme for determining the RX beam(s) to be used by neighboring gNB(s) during positioning based on a UE group ID is provided. In one example embodiment, the scheme may be used by neighboring gNB(s) for SRS reception. Positioning of UE(s) in a network may be determined using at least UL signals. The process may be a standalone UL positioning solution or an UL+DL solution, and RX beamforming may be used at the gNB.

FIG. 1 illustrates assigning a group ID for UL positioning for each UE based on characteristics of beam, signal strength, or signal distance (e.g. timing advance), according to an example embodiment. In particular, FIG. 1 illustrates a serving cell located in the center, surrounded by multiple neighboring cells (gNBs) and UEs separated into different groups. For instance, in one example embodiment, a group ID for UL positioning may be assigned to each UE based on certain network characteristics. Moreover, UEs with the same, common, or similar characteristics may be assigned with the same group ID. According to an example embodiment, the UEs with the same best RX beam(s) at the neighboring cells and/or serving cell may be placed in the same group. Moreover, the best RX beam may be the beam which when used, receives the signal with the highest power. For instance, in a case where the best RX beam is only slightly better than other RX beams, multiple best RX beams may be identified. In another example embodiment, UEs with the same, common, or similar characteristics may also be placed in the same group. For example, UEs that have the same serving cell RX beam and have similar timing advance values may be placed in the same group.

In an example embodiment, the user equipment characteristics for grouping may include one or more of SSB/CSI-RS index of the serving cell, SSB/CSI-RS index of the neighboring cells, timing advance (TA) of the UE, L3-RSRP report, the angle of departure at the serving cell and the angle of arrival at the serving cell. According to one example embodiment, the UE groups and group ID may be formed based on one or a combination of these characteristics. In another example embodiment, the groups may be formed based on SSB/CSI-RS index and TA. In another example embodiment, the SSB/CSI-RS indexes of the serving and neighboring cells may be used to form the groups. In a further example embodiment, the L3-RSRP report may be used to form the groups, and in another example embodiment, the angle of arrival at the serving gNB may be used to form the groups.

According to an example embodiment, each UE may be assigned with a unique group ID initially at the beginning of a training process to determine the best RX beam(s) at the neighboring cells and/or serving cell. In addition, rules for group ID allocation may be updated based on the outcome of the training process. In another example embodiment, the serving gNB may assign the group ID and then signal it to a location management function (LMF). The serving gNB may also organize the UEs into groups. Alternatively, in another example embodiment, the LMF may assign the group ID directly and may organize the UEs into groups. However, in doing so, it may be necessary for the serving gNB to signal the characteristics described above to the LMF. Further, in other example embodiments, the UEs in a group may be requested for UL positioning at the same time or at a different time.

Figure 2:
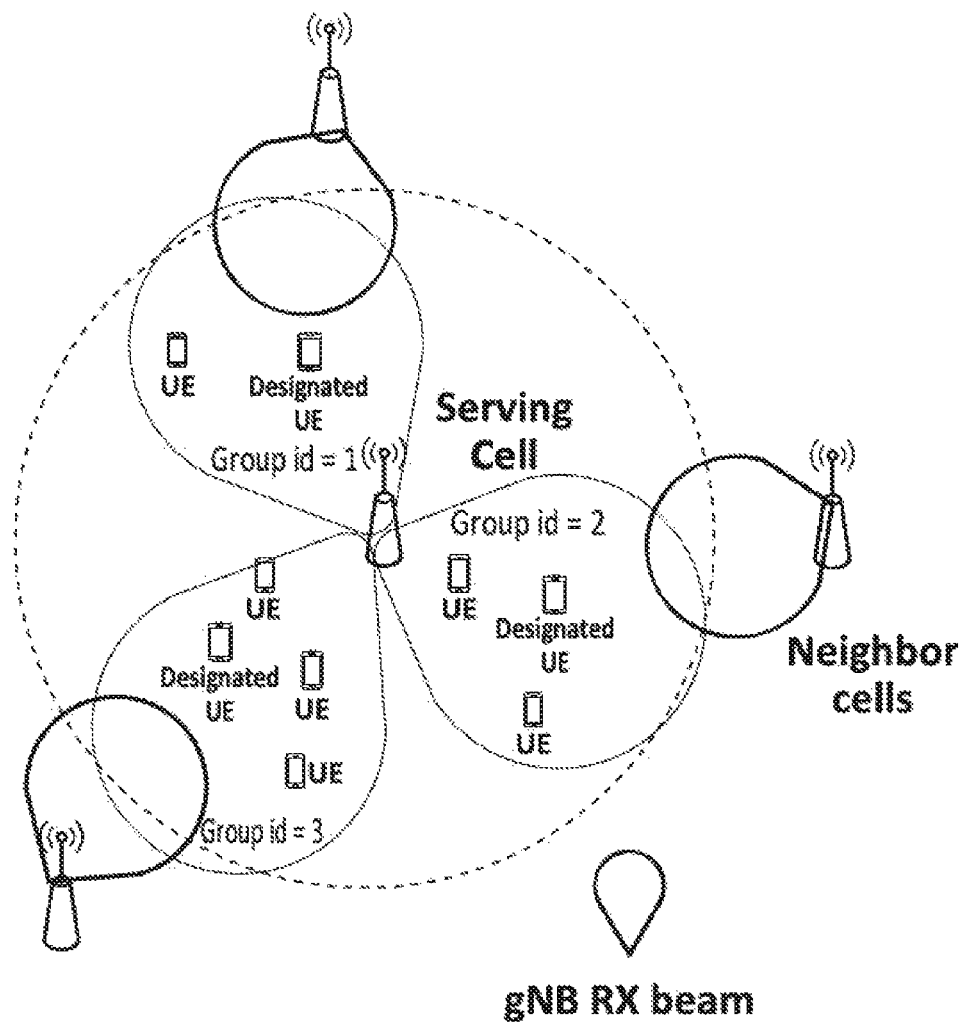
FIG. 2 illustrates a grouping procedure, according to an example embodiment.

FIG. 2 illustrates a grouping procedure, wherein a designated UE or anchor UE within a group may perform a repeated SRS so that neighboring gNB(s) can determine the best RX beam(s) for each group, according to an example embodiment. In an example embodiment, over time or as part of the training process, the best RX beam(s) may be determined at neighboring gNBs and/or the serving gNB for SRS reception of a particular group ID. The best RX beams may also be recorded and associated with that particular group ID. For instance, in an example embodiment, during the training, a designated UE within the group may repeat the SRS multiple times so that neighboring gNB(s) may perform RX beam sweeping to determine the best RX beam(s). In an example embodiment, only the designated UE, instead of all UEs within the group, would be required to perform this training step. Further, according to another example embodiment, a UE may be designated for this training step on a periodic basis, for example, at specific time periods. In one example embodiment, the time period may be every 10 seconds. However, other time periods may be used in other example embodiments.

According to an example embodiment, the number of RX beams used at a gNB for a group may be two or more. This number may still represent a reduction in the number of RX beams needed to be swept over. In a further example embodiment, a beam training operation with neighboring cells may be divided into multiple steps. The steps may include a coarse beam training step and a fine beam training step to refine measurement accuracy. In one example embodiment, the coarse beam training step may include the neighbor cells performing a sweep over their SSB beams. Further, the fine beam training step may include the neighbor cells performing a sweep procedure over CSI-RS beams that are within the original SSB beams. In another embodiment, the coarse beam training step may include the neighbor cells performing a received beam sweeping with beams having a large beamwidth. Further, the fine beam training step may include the neighbor cells performing a received beam sweeping with beams having a narrow beamwidth.

As illustrated by the beams with group IDs 4 and 5-7 in FIG. 1, a designated UE may make coarse beam information available to UEs in a group. Further, the fine beam training may be triggered by the LMF for measurement accuracy, as illustrated by the beam with group IDs 1-3 in FIG. 1. The fine beam refinement may be done by an individual UE or a smaller size UE group than the coarse beam group. In addition, the fine beam process may be needed in UL-AoA, for example, and the LMF may manage both a coarse beam group-ID and a fine beam group-ID, or either one of them individually. In addition, according to another example embodiment, an individual UE in the group or a smaller size of a UE group may try fine beam training using the coarse beam information.

In an example embodiment, the LMF may record the best RX beams (signaled from the neighboring gNBs) and then assign which beams may be used by the neighboring gNBs for a particular group ID. Alternatively, in another example embodiment, the neighboring gNBs may record the best RX beams and select which ones to use for a particular group ID locally.

According to an example embodiment, over time, the LMF may learn the best RX beams to use for particular group IDs. For example, a machine learning algorithm may be employed by the LMF to facilitate this learning. In an example embodiment, the learning may be in the form of a majority rule based on prior positioning measurement reports from gNB(s). For example, if there are 5 positioning occasions, and 3 or more UEs were found to have a common best RX beam, that RX beam may be deemed as the best RX beam to use for the group. In another example embodiment, the LMF may have the option of deciding to use more than one RX beam for a group at a neighboring cell. In this case, the LMF may need to signal the cell how many RX beams or which RX beams should be used for a group. The LMF may also ensure that the number of SRS repetitions is appropriate for the number of RX beams to be used by neighbor cells. The number of SRS repetitions may need to be signaled to the UE as well.

According to an example embodiment, the LMF may signal just the number of RX beams to be used. Alternatively, in another example embodiment, the LMF may signal the specific beams to be used (in the case where the best beams are determined at the LMF). In a further example embodiment, the number of RX beams may be determined by the LMF based on the confidence it has in the group association of the UE. For example, this may be the case when the LMF is highly confident one RX beam may be used. Otherwise, one or more adjacent beams may be used as well. In certain example embodiments, the confidence may be determined based on how many training samples are applicable, the quality of information used for group identification, and how close to the "center" of a UE group the LMF believes a particular UE lies.

Figure 3:
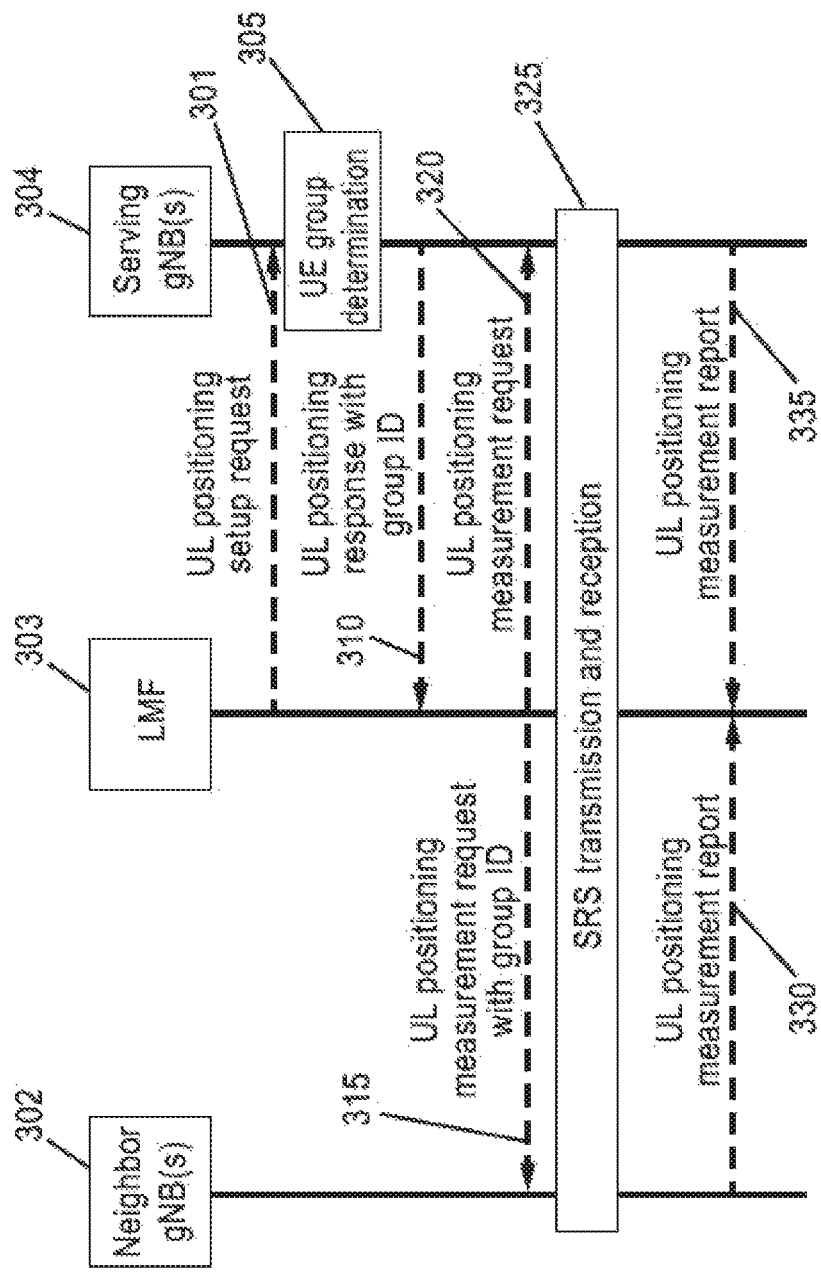
FIG. 3 illustrates an example of New Radio Positioning Protocol A signaling, according to an example embodiment.

In an example embodiment, the determination of the number of RX beams may be made based on reports (either during or after the training process) from the neighboring gNBs. According to an example embodiment, the reports may include information regarding the signal quality at each RX beam, and related beam information. These reports may be sent over, for example New Radio Positioning Protocol A (NRPPa), during a positioning occasion setup. For instance, FIG. 3 illustrates an example of NRPPa signaling, according to an example embodiment. As illustrated in FIG. 3, at 301, the LMF 303 may send an UL positioning setup request message to the serving gNB 304. At 305, the serving gNB 304 may determine the UE group based on one or more of the characteristics previously described, and assign the UE a group ID for UL positioning. At 310, the serving gNB 304 may send to the LMF 303 an UL positioning response message that includes the group ID of the UE. Then, at 315, the LMF 303 may send an UL positioning measurement request with the group ID to the neighbor gNB(s) 302. The LMF 303 may also, at 320, send an UL positioning measurement request to the serving gNB 304. After the neighbor gNB(s) 302 and the serving gNB 304 receive the UL positioning measurement request, an SRS transmission and reception procedure is initiated at 325. Once the SRS transmission and reception procedure is completed, the neighbor gNB(s) 302 may, at 330, send an UL positioning measurement report to the LMF 303. Similarly, the serving gNB 304 may send its own UL positioning measurement report to the LMF 303 at 335. In an example embodiment, the UL positioning measurement reports provided by the gNB and serving gNB may be measurement reports for positioning purposes. For example, this may include beam reporting or relative time of arrival (RTOA) reporting.

According to an example embodiment, the gNB(s) may transmit the group ID of UE(s) directly over an Xn interface. In the case of Local LMF functionality, this may be an effective way to realize certain example embodiments described herein. In another example embodiment, the signaling may be achieved by the SLmAP protocol or its corresponding NR version.

In an example embodiment, the group ID assigned to each UE may be used by the neighboring gNBs to determine the approximate RX beam to use for the reception and measurement of the SRS. Moreover, as the UE moves to different locations over time, the group ID may be updated based on the most recently in reported characteristics. Once the group ID changes, the LMF may signal the new group ID to the neighboring cells, and may optionally modify the SRS configuration for the UE. In another example embodiment, the UE may be static while the channel changes or the environment changes.

Figure 4:
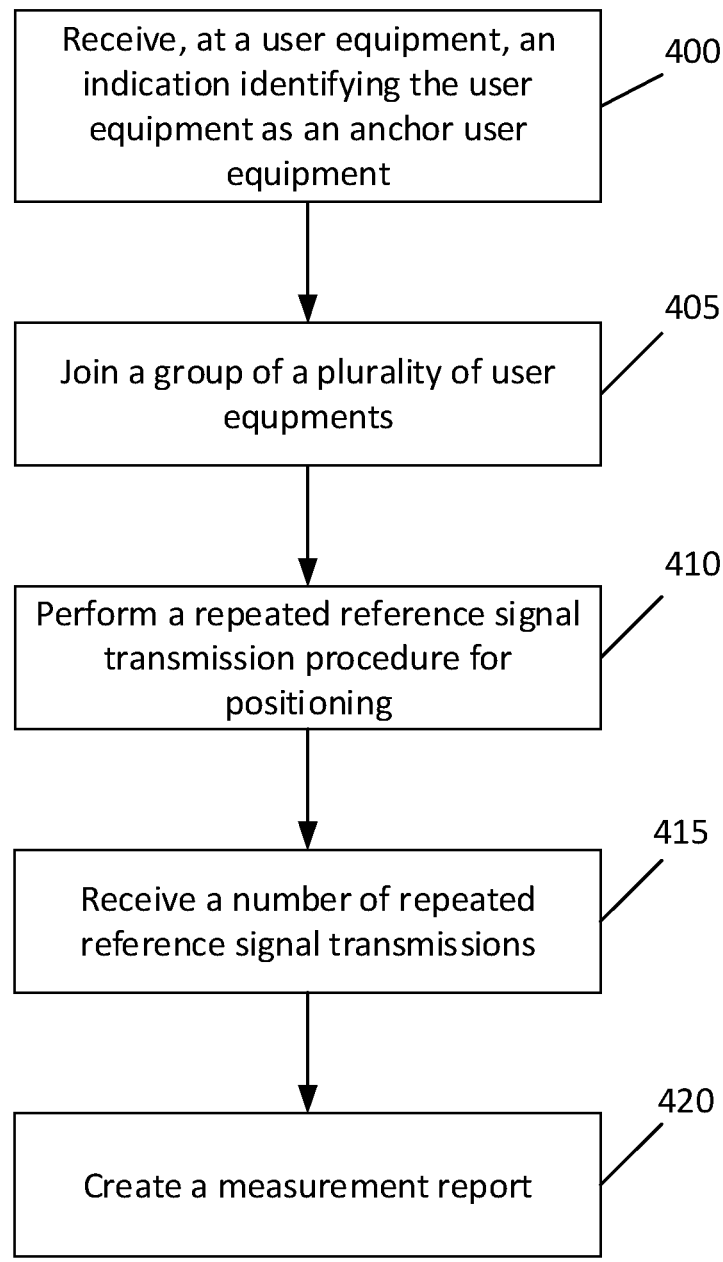
FIG. 4 illustrates a flow diagram of a method, according to an example embodiment.

FIG. 4 illustrates a flow diagram of a method, according to an example embodiment. In certain example embodiments, the flow diagram of FIG. 4 may be performed by a mobile station and/or UE, for instance similar to FIG. 7a. According to one embodiment, the method of FIG. 4 may include initially, at 400, receiving, at a user equipment, an indication identifying the user equipment as an anchor user equipment. The method may also include, at 405, join a group of user equipment with one or more user equipment according to user equipment characteristics. The method may further include, at 410, performing a repeated reference signal transmission procedure with a neighboring network element for positioning. The method may also include, at 415, receiving the number of repeated reference signal transmissions depending on a confidence level of the group associated with the apparatus. The method may further include, at 420, creating a measurement report to assist in a process of identifying the group. In an example embodiment, the measurement report may be an L3-RSRP report or another mobility report.

In an example embodiment, the repeated sounding reference signal transmission procedure may be performed by only a designated user equipment among the group of the plurality of other user equipments and the user equipment. In another example embodiment, the repeated sounding reference signal transmission procedure may be performed on a periodic basis time interval or on an aperiodic time interval basis. According to a further example embodiment, the one or more user equipment characteristics may include a synchronization signal block or a channel state information reference signal index of a serving network element, a synchronization signal block or a channel state information reference signal index of the neighboring network element, a timing advance of a user equipment, a reference signal received power report, a mobility measurement report, and an angle of arrival at the serving network element.

According to an example embodiment, the group identification may be received from the serving network element. In another example embodiment, the group identification may be received from a location management function. In an example embodiment, the user equipment of the plurality of other user equipments may be requested for UL positioning at a same time or at a different time. Further, in an example embodiment, the repeated sounding reference signal transmission procedure may include a coarse beam training procedure and a fine beam training procedure. In the coarse beam training procedure, coarse beam information may be found using the designated UE, and the coarse beam information may be used to assist the positioning process for the other UEs in that group. Further, the fine beam training procedure may be triggered by a location management function.

Figure 5:
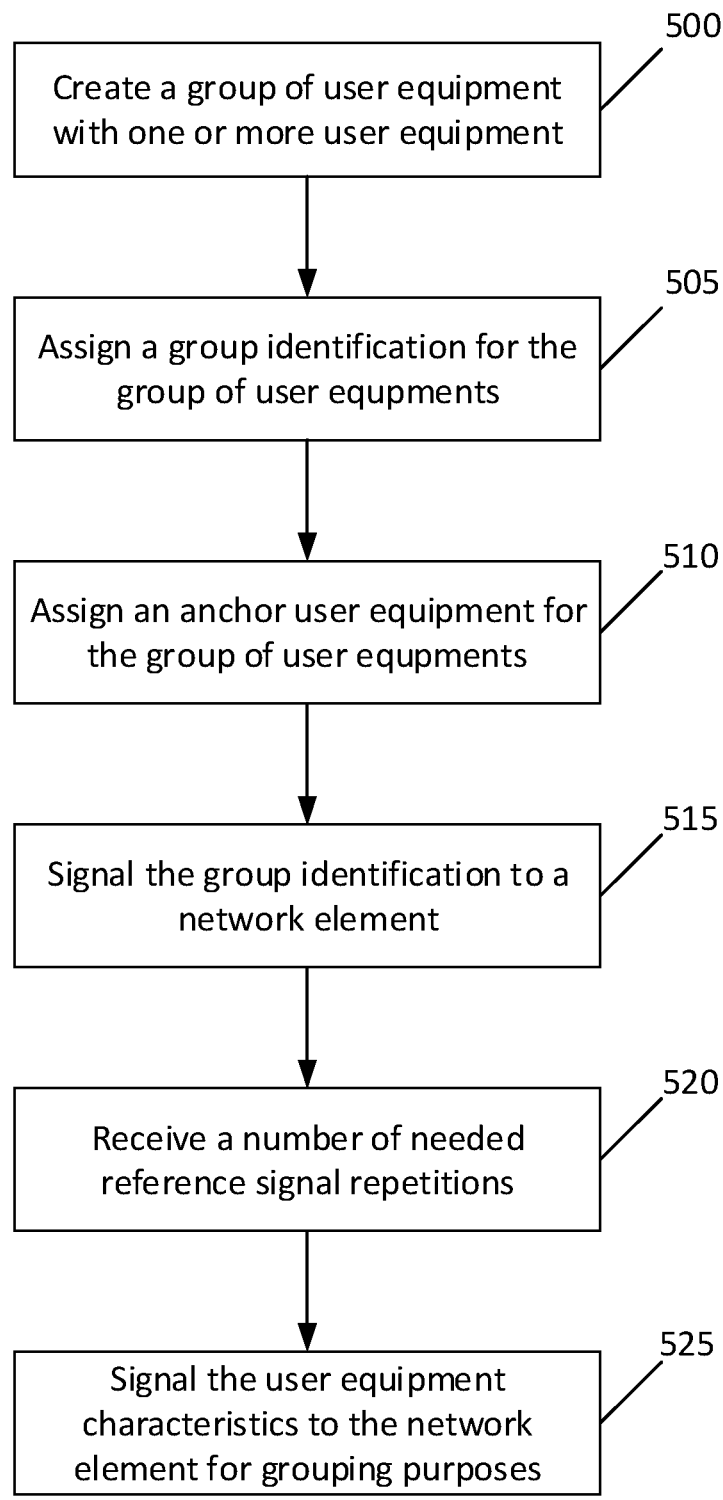
FIG. 5 illustrates a flow diagram of another method, according to an example embodiment.

FIG. 5 illustrates a flow diagram of another method, according to an example embodiment. In certain example embodiments, the flow diagram of FIG. 5 may be performed by a network entity or network node in a 3GPP system such as LTE or 5G NR. For instance, in some example embodiments, the method of FIG. 5 may be performed by a base station, eNB, or gNB like FIG. 7b. In some example embodiments, the method of FIG. 5 may be performed by a serving gNB.

According to one example embodiment, the method of FIG. 5 may include initially, at 500, creating a group of user equipment with one or more user equipment according to user equipment characteristics. The method may also include, at 505, assigning a group identification for the group of user equipments. At 510, assigning an anchor user equipment for the group of user equipments. At 515, signaling the group identification to a network element. The method may also include, at 520, receiving, from the network element, a number of needed reference signal repetitions. Further, the method may include, at 525, signaling the user equipment characteristics to the network element for grouping purposes.

According to an example embodiment, the one or more user equipment characteristics may include one or more of a synchronization signal block or a channel state information reference signal index of the network element, a synchronization signal block or a channel state information reference signal index of a neighboring network element, a timing advance of a user equipment, a reference signal received power report, a mobility measurement report, an angle of departure at the network element, and an angle of arrival at the network element. In another example embodiment, the group identification may be updated based on changing locations characteristics or channel conditions of the user equipment. According to a further example embodiment, the number of needed reference signal repetitions may be determined by a coarse beam training procedure and a fine beam training procedure.

Figure 6:
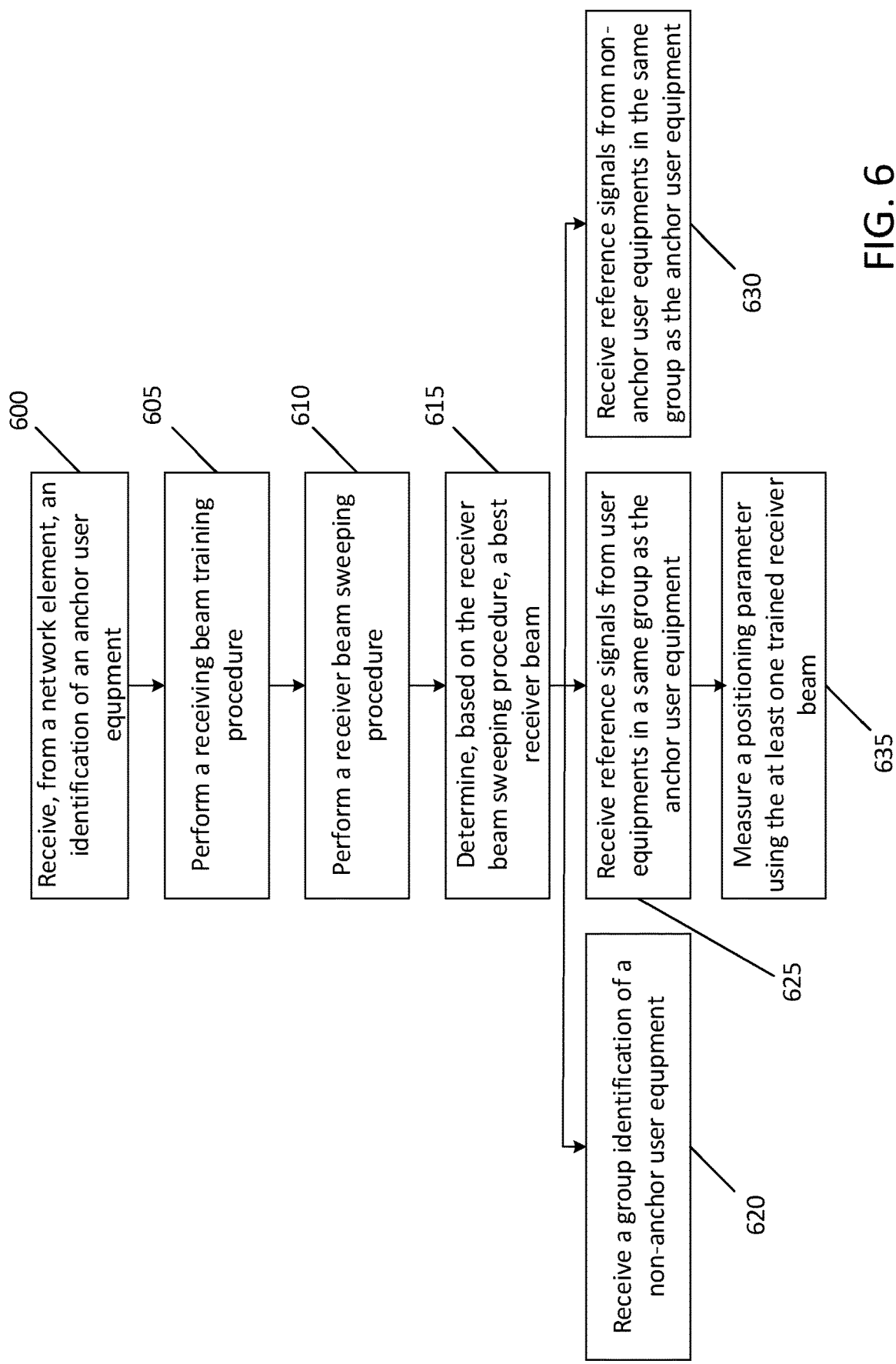
FIG. 6 illustrates a flow diagram of yet another method, according to an example embodiment.

FIG. 6 illustrates an example flow diagram of another method, according to an example embodiment. FIG. 6 may be performed by a network entity or network node in a 3GPP system such as LTE or 5G NR. For instance, in some example embodiments, the method of FIG. 6 may be performed by a base station, eNB, or gNB like FIG. 7b. In some example embodiments, the method of FIG. 6 may be performed by a neighboring gNB.

According to one example embodiment, the method of FIG. 6 may include initially, at 600, receiving, from a network element, an identification of an anchor user equipment at a neighboring network element. The method may also include, at 605, performing a receiving beam training procedure with the anchor user equipment to obtain a trained receiver beam. Further, at 610, the method may include performing a receiver beam sweeping procedure to receive a reference signal from the anchor user equipment. The method may also include, at 615, determining, based on the receiver beam sweeping procedure, at least one best receiver beam for the anchor user equipment. At 620, the method may include receiving a group identification of a non-anchor user equipment. Further, at 625, the method may include receiving, with the at least one trained receiver beam for the anchor user equipment, reference signals from user equipments in a same group as the anchor user equipment. In addition, at 630, the method may include receiving, with the at least one trained receiver beam for the anchor user equipment, reference signals from non-anchor user equipments in the same group as the anchor user equipment. Further, at 635, the method may include measuring a positioning parameter using the at least one trained receiver beam.

In an example embodiment, the repeated sounding reference signal receiving procedure may be performed on a periodic basis time interval or on an aperiodic basis time interval. According to an example embodiment, the anchor user equipment and the non-anchor user equipment belong to a same group having similar user equipment characteristics. In another example embodiment, the one or more user equipment characteristics may include a synchronization signal block or a channel state information reference signal index of the network element, a synchronization signal block or a channel state information reference signal index of a neighboring network element, a timing advance of the user equipment, a reference signal received power report, a mobility measurement report, an angle of departure at the network element, and an angle of arrival at the serving network element. In another example embodiment, the anchor user equipment and the non-anchor user equipment belong to a same group having similar network characteristics. According to another example embodiment, the number of best receiver beams may be determined based on a confidence level in a group identification associated with the anchor user equipment.

Figure 7A:
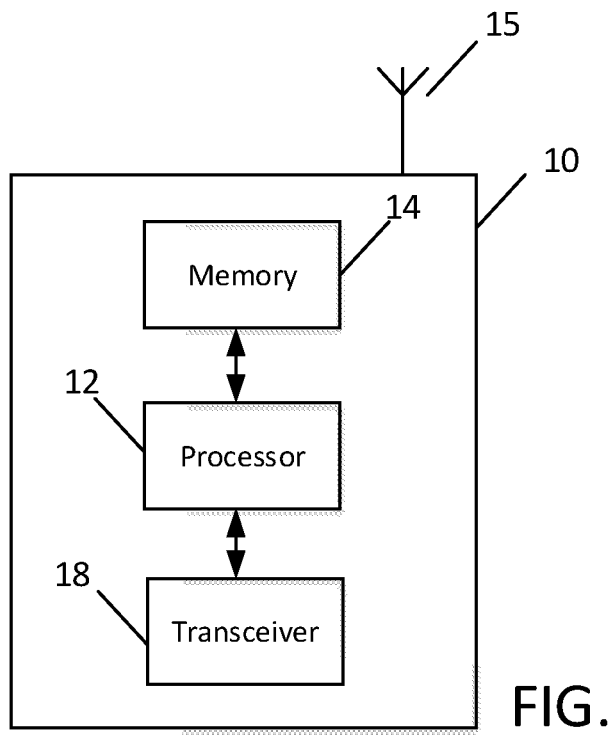
FIG. 7a illustrates a block diagram of an apparatus according to an example embodiment.

FIG. 7a illustrates an example of an apparatus 10 according to another embodiment. In an embodiment, apparatus 10 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 10 may be implemented in, for instance, a wireless handheld device, a wireless plug-in accessory, or the like.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 7a.

As illustrated in the example of FIG. 7a, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7a, multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 18 for receiving a downlink signal and for transmitting via an uplink from apparatus 10. Apparatus 10 may further include a transceiver 18 configured to transmit and receive information. The transceiver 28 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 10 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 28 may be included in or may form a part of transceiving circuitry.

As discussed above, according to certain example embodiments, apparatus 10 may be a UE, mobile device, mobile station, ME, IoT device and/or NB-IoT device, for example. According to certain embodiments, apparatus 10 may be controlled by memory 14 and processor 12 to perform the functions associated with example embodiments described herein. For example, in some embodiments, apparatus 10 may be configured to perform one or more of the processes depicted in any of the flow charts or signaling diagrams described herein, such as the flow diagrams illustrated in FIGS. 1-4.

For instance, in one embodiment, apparatus 10 may be controlled by memory 14 and processor 12 to receive an indication identifying the apparatus as an anchor user equipment. The apparatus 10 may also be controlled by memory 14 and processor 12 to join a group of user equipment with one or more user equipment according to user equipment characteristics. The apparatus 10 may further be controlled by memory 14 and processor 12 to perform a repeated reference signal transmission procedure with a neighboring network element for positioning.

Figure 7B:
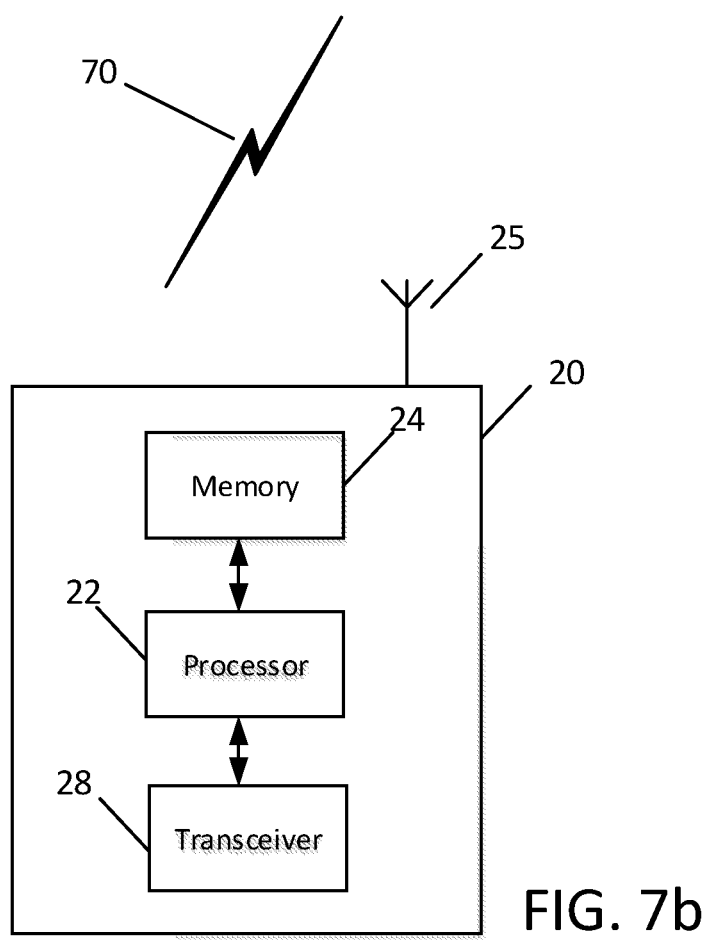
FIG. 7b illustrates a block diagram of another apparatus according to an example embodiment.

FIG. 7b illustrates an example of an apparatus 20 according to an example embodiment. In an example embodiment, apparatus 20 may be a node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. In certain example embodiments, apparatus 20 may be an eNB in LTE or gNB in 5G. Alternatively, apparatus 20 may be a network element such as, for example a serving gNB or neighboring gNB.

It should be understood that, in some example embodiments, apparatus 20 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 20 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 20 may include components or features not shown in FIG. 7b.

As illustrated in the example of FIG. 7b, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network node or RAN node, such as a base station, access point, Node B, eNB, gNB, WLAN access point, or the like. In another example embodiment, apparatus 20 may be an LFM. According to certain embodiments, apparatus 10 may be controlled by memory 24 and processor 22 to perform the functions associated with any of the embodiments described herein, such as the flow or signaling diagrams illustrated in FIGS. 1-3, 5, and 6.

For instance, in one embodiment, apparatus 20 may be controlled by memory 24 and processor 22 to create a group of user equipment with one or more user equipment according to user equipment characteristics. The apparatus 20 may also be controlled by memory 24 and processor 22 to assign a group identification for the group of user equipments. The apparatus 20 may further be controlled by memory 24 and processor 22 to assign an anchor user equipment for the group of user equipments. In addition, the apparatus 20 may be controlled by memory 24 and processor 22 to signal the group identification to a network element. In addition, the apparatus 20 may be controlled by memory 24 and processor 22 to receive, from the network element, a number of needed reference signal repetitions. Further, the apparatus 20 may be controlled by memory 24 and processor 22 to signal the user equipment characteristics to the network element for grouping purposes.

According to another embodiment, apparatus 20 may be controlled by memory 24 and processor 22 to receive, from a network element, an identification of an anchor user equipment at a neighboring network element. The apparatus 20 may also be controlled by memory 24 and processor 22 to perform a receiving beam training procedure with the anchor user equipment to obtain a trained receiver beam. The apparatus 20 may further be controlled by memory 24 and processor 22 to perform a receiver beam sweeping procedure to receive a reference signal from the anchor user equipment. The apparatus 20 may also be controlled by memory 24 and processor 22 to determine, based on the receiver beam sweeping procedure, at least one best receiver beam for the anchor user equipment. The apparatus 20 may further be controlled by memory 24 and processor 22 to receive a group identification of a non-anchor user equipment, receive, with the trained receiver beam for the anchor user equipment, reference signals from user equipments in a same group as the anchor user equipment, measure a positioning parameter using the at least one trained receiver beam, and receive, with the trained receiver beam for the anchor user equipment, reference signals from non-anchor user equipments in the same group as the anchor user equipment.

Certain example embodiments described herein provide several technical improvements, enhancements, and/or advantages. For example, according to certain example embodiments, it may be possible to address the problems of RX beam selection at neighboring gNBs for UL positioning measurements. It may also be possible to use UE groups to determine and signal the best RX beams at neighbor gNB(s) for SRS reception. According to other example embodiments, it may be possible to minimize the number of repeated SRS transmissions necessary for positioning. This may in turn lower the overhead of positioning schemes using UL signals, and decrease the interference caused by SRS transmissions.

Other example embodiments may provide lower UE measurement requirements including, for example, less SSB/CSI-RS measurements from neighbor cells needed. In addition, certain example embodiments may provide lower latency and UE power saving, as well as a reduction in SRS overhead needed for RX beam sweeping by gNB(s) during positioning occasions.

Although certain example embodiments described herein assume that the gNB(s) are entities that are making the UL measurements, certain example embodiments may also apply in the case that the LMU is used for UL positioning. For example, this may include class 1 and 2 LMUs, which may be used for FR2 as the requirements on the antenna capabilities may be more strict. Moreover, although using SRS is described herein, in other example embodiments, it may be applicable to any UL signal that is used for positioning purposes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to 5G NR and LTE technology, the above embodiments may also apply to any other present or future 3GPP technology, such as LTE-advanced, and/or fourth generation (4G) technology.

PARTIAL GLOSSARY

CSI-RS Channel State Information Reference Signal
DL-AoD Downlink Angle of Departure
DL-TDOA Downlink Time Difference of Arrival
gNB 5G or NR Base Station
LMF Location Management Function
LMU Location Measurement Unit
NR New Radio (5G)
RRM Radio Resource Management
RX Receiver
SSB Synchronization Signal Block
SRS Sounding Reference Signal
TX Transmitter
UE User Equipment
UL Uplink

What is claimed is:

1. An apparatus, comprising:
   at least one processor; and
   at least one memory comprising computer program code,
   the at least one memory and the computer program code are configured, with the at least one processor to cause the apparatus at least to receive, from a network element, an identification of an anchor user equipment at a neighboring network element;
   perform a receiving beam training procedure with the anchor user equipment to obtain a trained receiver beam;
   perform a receiver beam sweeping procedure to receive a reference signal from the anchor user equipment;
   determine, based on the receiver beam sweeping procedure, at least one best receiver beam for the anchor user equipment;
   receive a group identification of a non-anchor user equipment; and
   receive, with at least one trained receiver beam for the anchor user equipment, reference signals from the non-anchor user equipment in the same group as the anchor user equipment.

2. The apparatus according to claim 1, wherein the at least one memory and the computer program code are further configured, with the at least one processor to cause the apparatus at least to:
   receive, with the at least one trained receiver beam for the anchor user equipment, reference signals from user equipments in a same group as the anchor user equipment.

3. The apparatus according to claim 1, wherein the at least one memory and the computer program code are further configured, with the at least one processor to cause the apparatus at least to measure a positioning parameter using the at least one trained receiver beam.

4. The apparatus according to claim 1, wherein the receiving beam training procedure is performed on a periodic basis time interval or on an aperiodic basis time interval.

5. The apparatus according to claim 1, wherein the anchor user equipment and the non-anchor user equipment belong to a same group having similar user equipment characteristics.

6. The apparatus according to claim 1, wherein the anchor user equipment characteristics comprise at least one of:

a synchronization signal block or a channel state information reference signal index of a serving network element;

a synchronization signal block or a channel state information reference signal index of the apparatus;

a timing advance of a user equipment;

a reference signal received power report; a mobility measurement report;

an angle of departure at the serving network element; or an angle of arrival at the serving network element.

7. The apparatus according to claim 1, wherein a number of best receiver beams are determined based on a confidence level in a group identification associated with the anchor user equipment.

* * * * *